United States Patent
Sewell

(10) Patent No.: US 11,059,682 B2
(45) Date of Patent: Jul. 13, 2021

(54) OFFLOADING VACUUM TANK

(71) Applicant: The Charles Machine Works, Inc., Perry, OK (US)

(72) Inventor: Cody L. Sewell, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 16/223,568

(22) Filed: Dec. 18, 2018

(65) Prior Publication Data

US 2019/0193960 A1 Jun. 27, 2019

Related U.S. Application Data

(60) Provisional application No. 62/609,070, filed on Dec. 21, 2017.

(51) Int. Cl.

| | | |
|---|---|---|
| *B65G 67/04* | (2006.01) | |
| *B65G 33/14* | (2006.01) | |
| *B01D 45/12* | (2006.01) | |
| *B01D 50/00* | (2006.01) | |
| *E02F 7/00* | (2006.01) | |
| *E02F 5/08* | (2006.01) | |
| *B65G 33/10* | (2006.01) | |

(52) U.S. Cl.
CPC ............ *B65G 67/04* (2013.01); *B01D 45/12* (2013.01); *B01D 50/002* (2013.01); *B65G 33/10* (2013.01); *B65G 33/14* (2013.01); *E02F 7/00* (2013.01); *B65G 2812/0577* (2013.01); *B65G 2814/0326* (2013.01); *E02F 5/08* (2013.01)

(58) Field of Classification Search
CPC ............ B65G 67/04; B65G 2812/0577; B65G 2814/0326; B65G 33/10; B65G 33/14; E02F 5/08; E02F 7/00; B01D 45/12; B01D 50/002
See application file for complete search history.

(56) References Cited

U.S. PATENT DOCUMENTS

| | | |
|---|---|---|
| 187,768 A | 2/1877 | Munzinger |
| 522,137 A | 6/1894 | Walker |
| 1,287,290 A | 12/1918 | Golden |
| 1,311,009 A | 7/1919 | Rinehimer |
| 1,944,976 A | 1/1934 | Hamilton |
| 2,264,216 A | 11/1941 | Milligan |
| 2,352,192 A | 6/1944 | Gasche |
| 2,556,354 A | 6/1951 | Williamson et al. |
| 2,639,144 A | 5/1953 | Long |
| 2,639,601 A | 5/1953 | Miller |
| 2,734,656 A | 2/1956 | Schonfeld |
| 2,816,683 A | 12/1957 | Miers et al. |
| 2,823,825 A | 2/1958 | Coffman |

(Continued)

*Primary Examiner* — Saul Rodriguez
*Assistant Examiner* — Ashley K Romano
(74) *Attorney, Agent, or Firm* — Tomlinson McKinstry, P.C.

(57) ABSTRACT

An offloading vacuum system. The system has a tank to capture debris from an excavation site. The debris is pulled into the tank due to a blower pulling air into an attached hose. An internal conveyor within the tank conveys material to an offloading hub. The offloading hub has a ground-facing door which opens to deposit debris into an external conveyor. The external conveyor, when deployed, can move debris from below the tank to a dump container with a wall greater than a height of the tank.

22 Claims, 13 Drawing Sheets

(56) References Cited

U.S. PATENT DOCUMENTS

| | | | |
|---|---|---|---|
| 2,867,329 | A | 1/1959 | Miller |
| 2,927,787 | A | 3/1960 | Maher |
| 3,195,761 | A | 7/1965 | Coates |
| 3,311,255 | A | 3/1967 | Loveless |
| 3,540,618 | A | 11/1970 | Jakobsen |
| 3,628,687 | A | 12/1971 | Townsend |
| 3,713,472 | A | 1/1973 | Dozois |
| 3,768,203 | A | 10/1973 | Bellucci |
| 3,841,676 | A | 10/1974 | Hover |
| 3,860,142 | A | 1/1975 | Jurges |
| 3,888,045 | A | 6/1975 | Piegza |
| 3,924,778 | A | 12/1975 | Sorensen |
| 4,017,281 | A | 4/1977 | Johnstone |
| 4,119,238 | A | 10/1978 | Ja'afar et al. |
| 4,135,640 | A | 1/1979 | MacQuilkin et al. |
| 4,155,586 | A | 5/1979 | Flynn |
| 4,199,837 | A | 4/1980 | Fisco, Jr. |
| 4,222,404 | A | 9/1980 | Flynn |
| 4,307,541 | A | 12/1981 | Farmer et al. |
| 4,334,633 | A | 6/1982 | Piegza |
| 4,518,095 | A | 5/1985 | Engwert |
| 4,566,375 | A | 1/1986 | van der Schoot |
| 4,644,874 | A | 2/1987 | Kleykamp |
| 4,669,628 | A | 6/1987 | Hatta |
| 4,690,070 | A | 9/1987 | Miller |
| 4,922,571 | A | 5/1990 | Driear |
| 5,016,717 | A | 5/1991 | Simons et al. |
| 5,021,156 | A | 6/1991 | Sloan |
| 5,092,963 | A | 3/1992 | Barker et al. |
| 5,103,592 | A | 4/1992 | Janitzky |
| 5,120,217 | A | 6/1992 | O'Brien et al. |
| 5,141,528 | A | 8/1992 | Boczkiewicz et al. |
| 5,191,993 | A | 3/1993 | Wanger et al. |
| 5,299,370 | A | 4/1994 | Gyori et al. |
| 5,366,317 | A | 11/1994 | Solimar |
| 5,394,650 | A | 3/1995 | Dean |
| 5,596,788 | A | 1/1997 | Linville et al. |
| 5,700,043 | A | 12/1997 | Rohard et al. |
| 5,791,073 | A | 8/1998 | Palmer et al. |
| 5,919,421 | A | 7/1999 | Monz et al. |
| 5,937,581 | A | 8/1999 | Matye et al. |
| 5,960,980 | A | 10/1999 | Burke et al. |
| 6,007,270 | A | 12/1999 | Bowman |
| 6,050,199 | A | 4/2000 | Anderson et al. |
| 6,055,775 | A | 5/2000 | Dering et al. |
| 6,109,823 | A | 8/2000 | Halferty et al. |
| 6,182,952 | B1 | 2/2001 | Guiterrez |
| 6,293,051 | B1 | 9/2001 | Matye |
| 6,385,867 | B1 | 5/2002 | Slabach et al. |
| 6,386,598 | B1 | 5/2002 | Dykstra et al. |
| 6,391,258 | B1 | 5/2002 | Peake et al. |
| 6,438,792 | B1 | 8/2002 | Cappellotto |
| 6,407,605 | B1 | 10/2002 | Gilman et al. |
| 6,615,849 | B1 | 9/2003 | Gilman et al. |
| 6,966,724 | B2 | 11/2005 | Robinson |
| 7,255,039 | B2 | 8/2007 | Halliday et al. |
| 7,451,521 | B2 | 11/2008 | Cappellotto |
| 7,712,181 | B2 | 5/2010 | Riach |
| 7,802,694 | B2 | 9/2010 | Lee |
| 7,837,050 | B2 * | 11/2010 | Maybury, Jr. ......... E02F 3/8816 220/211 |
| 8,066,140 | B1 | 11/2011 | Young et al. |
| 8,297,463 | B2 | 10/2012 | McQuaid et al. |
| 8,360,260 | B2 | 1/2013 | Maybury, Jr. |
| 8,540,103 | B2 | 9/2013 | Lollis et al. |
| 8,596,697 | B1 | 12/2013 | Haibel |
| 8,667,717 | B2 | 3/2014 | Maybury et al. |
| 8,802,023 | B1 | 8/2014 | Lewis et al. |
| 8,925,753 | B2 | 1/2015 | Maybury |
| 9,057,180 | B1 | 6/2015 | Sewell |
| 9,103,091 | B2 | 8/2015 | Buckner |
| 9,821,953 | B2 | 11/2017 | Sewell et al. |
| 10,150,619 | B2 | 12/2018 | Wiedemann |
| 10,259,647 | B2 * | 4/2019 | McCoy ................ B65D 88/54 |
| 10,851,517 | B2 | 12/2020 | Pino, Jr. et al. |
| 2002/0000748 | A1 | 1/2002 | Fuller et al. |
| 2004/0108317 | A1 * | 6/2004 | Buckner .................. F17C 1/00 220/263 |
| 2006/0032095 | A1 * | 2/2006 | Buckner ............... E02F 3/8816 37/304 |
| 2006/0086010 | A1 * | 4/2006 | Jarnecke ............... E02F 3/8816 37/317 |
| 2006/0117612 | A1 * | 6/2006 | Maybury, Jr. ........... E02F 3/925 37/304 |
| 2006/0118338 | A1 * | 6/2006 | Maybury, Jr. ......... E21B 21/015 175/213 |
| 2006/0182591 | A1 * | 8/2006 | Hackett ................ B28C 5/4272 414/685 |
| 2006/0236499 | A1 | 10/2006 | Cappellotto |
| 2007/0261309 | A1 * | 11/2007 | Tommell ................ E05F 15/63 49/339 |
| 2008/0028688 | A1 | 2/2008 | Neuber |
| 2008/0066383 | A1 * | 3/2008 | Decker .................. E05D 15/54 49/339 |
| 2008/0244859 | A1 * | 10/2008 | Maybury .............. E02F 3/8816 15/340.2 |
| 2010/0064649 | A1 | 3/2010 | Harada et al. |
| 2010/0320204 | A1 | 12/2010 | Maybury, Jr. |
| 2010/0325481 | A1 | 12/2010 | Dahan et al. |
| 2011/0107548 | A1 | 5/2011 | Maybury, Jr. |
| 2011/0296646 | A1 | 12/2011 | Showley |
| 2012/0317882 | A1 * | 12/2012 | Zazula .................... E05F 11/04 49/339 |
| 2013/0097933 | A1 | 4/2013 | Royer et al. |
| 2013/0134163 | A1 | 5/2013 | Maybury, Jr. |
| 2015/0291350 | A1 | 10/2015 | Sewell et al. |
| 2015/0308574 | A1 | 10/2015 | Kegler |
| 2017/0292306 | A1 | 10/2017 | Sewell |

* cited by examiner

OFFLOADING VACUUM TANK

FIELD

The invention is directed to a vacuum system for removing debris from an excavation site.

BACKGROUND

Microtrenching, and other applications utilizing a saw blade, allows a small trench to be uncovered in a surface. Such a system allows for minimal disruption to an existing surface during placement of a utility line or cable within the uncovered trench. A layer of grout may be placed above the cable, returning the surface to operation. One exemplary microtrenching operation is described in U.S. Pat. No. 8,375,605, the contents of which are incorporated herein by reference.

Microtrenching operations, and similar operations, generate a volume of solid debris. This debris may be uncovered dirt or loose asphalt. A vacuum system is often provided with a microtrencher to reduce dust on the jobsite and clean the excavation site.

Typically, material captured by a vacuum tank is unloaded by opening a door attached to an end of the tank. Material is removed by tipping the tank while the door is open. This configuration makes it difficult to transfer the material into a dump truck or other containers that have openings positioned high off the ground. Further, such a configuration makes controlling the removal of material from the tank difficult if, for example, only a portion of the debris is to be offloaded.

Transferring the material to a dump truck or other container may be necessary if the material is going to be reclaimed or reused. Therefore, there is a need for a mechanism that will allow more precise offloading of particulates to locations high off of the ground.

SUMMARY

The invention is directed to an apparatus. The apparatus comprises a tank, a plurality of ground contacting motive elements above which the tank is supported, an internal conveyor, a blower, and an external conveyor. The tank has an inlet and first and second outlets. The internal conveyor is situated entirely within the tank and having a discharge end situated near the second outlet. The blower is in communication with the first outlet. The external conveyor is situated entirely outside of the tank having an input end situated near the second outlet.

The invention is further directed to an apparatus. The apparatus has a tank with an inlet and first and second outlets. The apparatus also has a means for pulling earth through the first outlet and out of the tank, and a means for transporting spoils from the second outlet of the tank to a location above the upper most surface of the tank.

DETAILED DESCRIPTION

Figure 11:
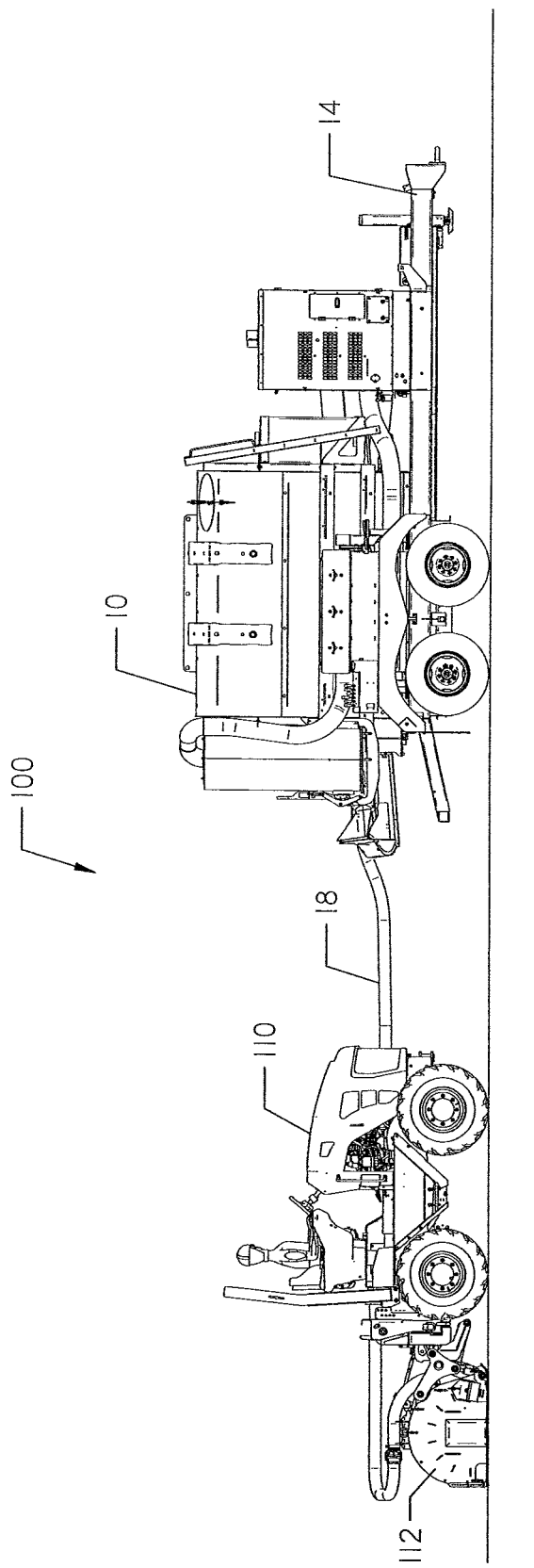
FIG. 11 is a side view of the vacuum system in use with a microtrenching assembly.
Figure 12:
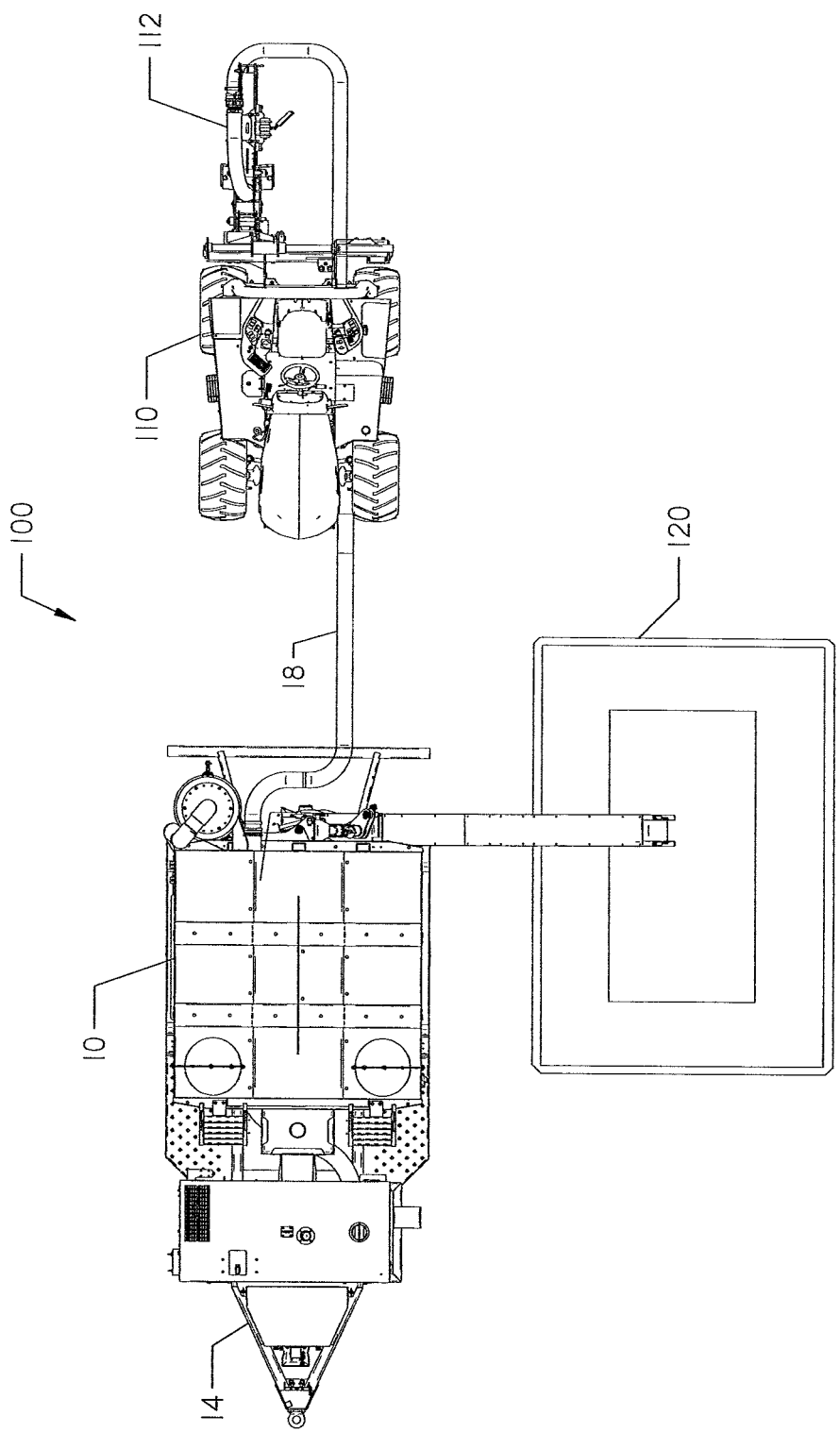
FIG. 12 is a top view of the vacuum system, a microtrenching assembly, and a dump container in series.

With reference now to FIGS. 11 and 12, a system 100 for removing spoils from a job site is shown. The system 100 comprises a microtrencher 110, a vacuum system 10, and a dump container 120. Material is removed from a trench by a blade assembly 112 disposed on the microtrencher 110. The blade assembly 112 comprises a hood 114 substantially enclosing a volume around the blade (not shown).

A hose 18 is disposed between the vacuum system 10 and the microtrencher 110. The hose 18 provides a pathway for air and particulates to travel from the hood 114 to the vacuum system 10. While a microtrencher 110 is shown herein, other apparatus, such as graders, trenchers, earth saws and the like may be used with the vacuum system 10 described herein. Additionally, the hose 18 may be used separately from such a device to interconnect the excavation site and the vacuum system 10.

The vacuum system 10 is shown disposed on a trailer 14. Alternatively, the vacuum system 10 may be on a self-propelled truck.

The dump container 120 is provided to deposit and store particulates removed from the vacuum assembly 10. This dump container 120 may be a dumpster, dump truck, or other container. The dump container 120 may be present on the job site, as shown, or the vacuum system 10 may be moved to a location proximate to the dump container for depositing debris removed from the vacuum assembly, as will be described in more detail below.

Figure 1:
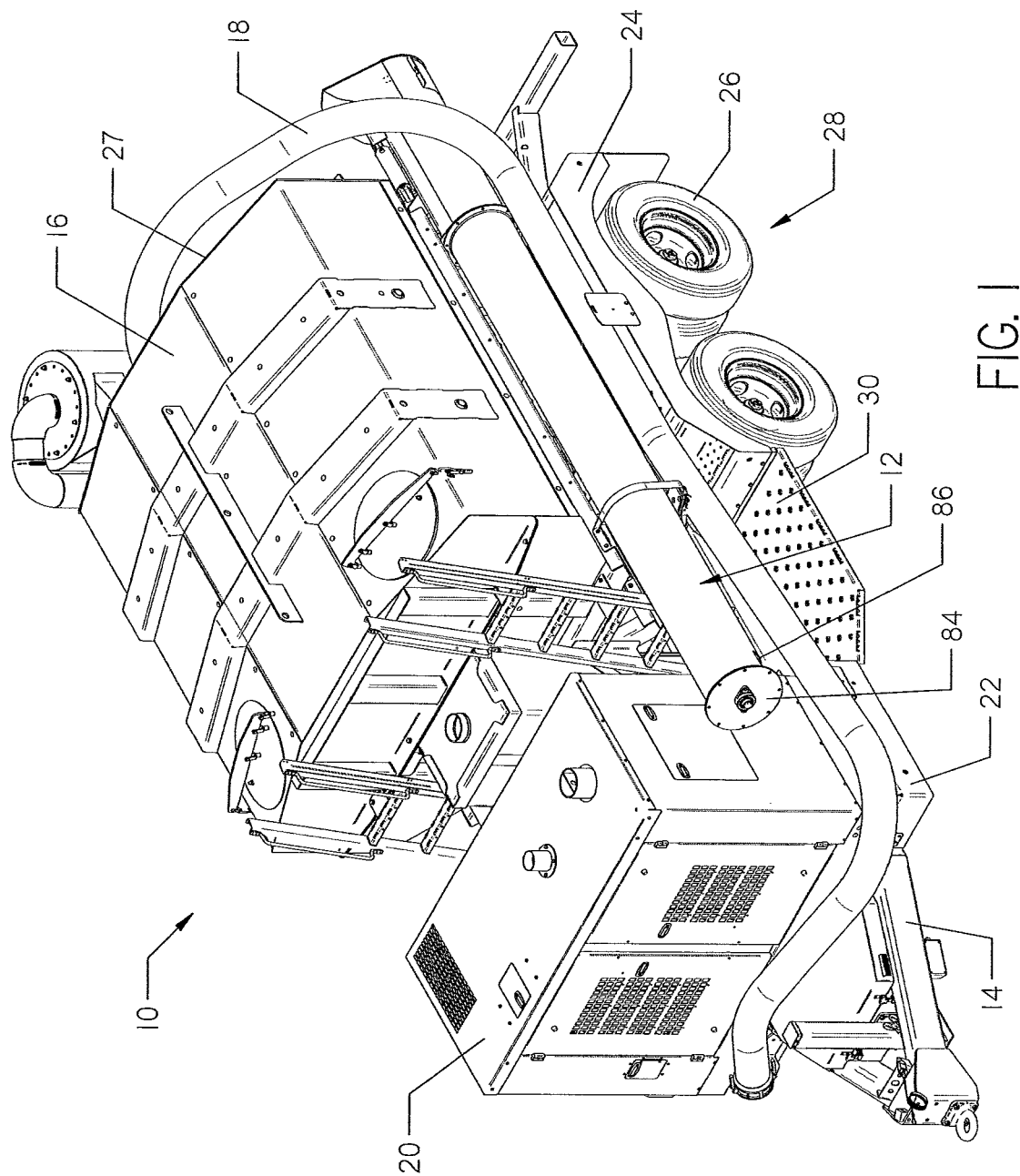
FIG. 1 is a perspective view of a first side of a vacuum system of the present invention. An external conveyor is shown in the lowered position.

With reference to FIG. 1 the vacuum system 10 is shown in detail. The vacuum system 10 comprises an external conveyor 12 attached to but completely external from a tank 16. As described in detail later herein, the external conveyor 12 may unload material captured by the system 10 and deposited in the tank 16 into a dump truck or other container positioned high off the ground.

Continuing with FIG. 1, the vacuum system 10 is supported on a trailer 14. The system 10 comprises the tank 16, first and second conduits such as hoses 18 and 19, and a power pack 20. The power pack 20 is supported on a forward end 22 of the trailer 14. The power pack 20 comprises a blower which creates airflow. The blower pulls air through a second conduit, or hose 19, from the tank 16. As the tank 16 is substantially sealed, air must be pulled into the tank through the hose 18. Such airflow allows debris to be removed from the excavation site to the tank 16.

Figure 3:
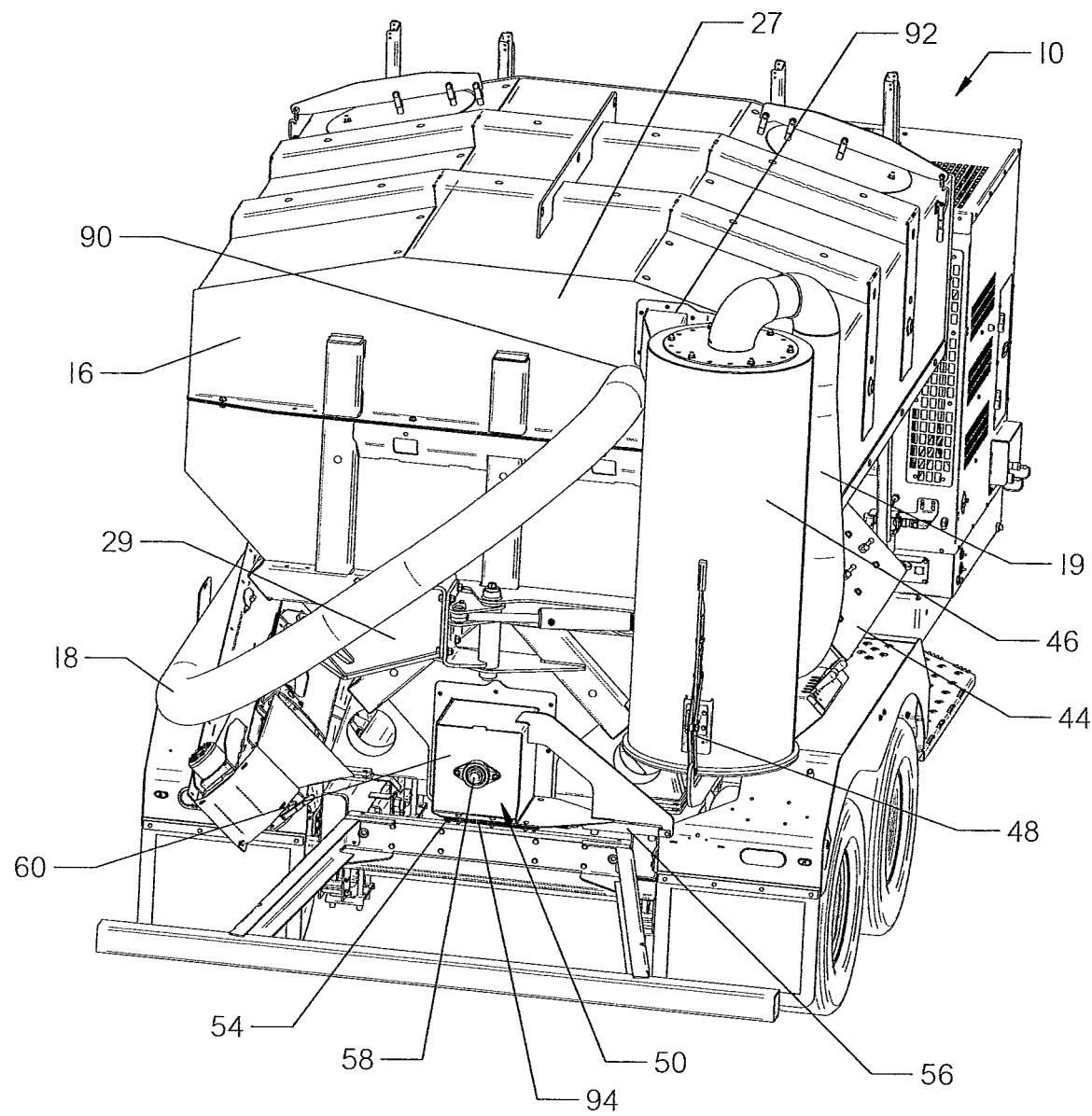
FIG. 3 is a rear perspective view of the vacuum system of FIG. 1.

The tank 16 is supported on a rear end 24 of the trailer 14 above a series of ground contacting motive elements, such as wheels 26. The tank 16 shown in the figures spans the width of the trailer 14 and has downwardly converging side walls similar to that of a funnel or a hopper (FIG. 3). However, the tank 16 may take on different shapes and sizes as desired.

The external conveyor 12 is attached to a rear end 27 of the tank 16 via a bracket 29 (FIG. 3). The external conveyor 12 is movable between a lowered or stowed position and a raised position. The external conveyor 12 is shown in a lowered or stowed position in FIG. 1, and is shown in the raised position in FIGS. 5 and 7. Preferably, the external conveyor 12 is situated completely outside of the tank 16.

Figure 5:
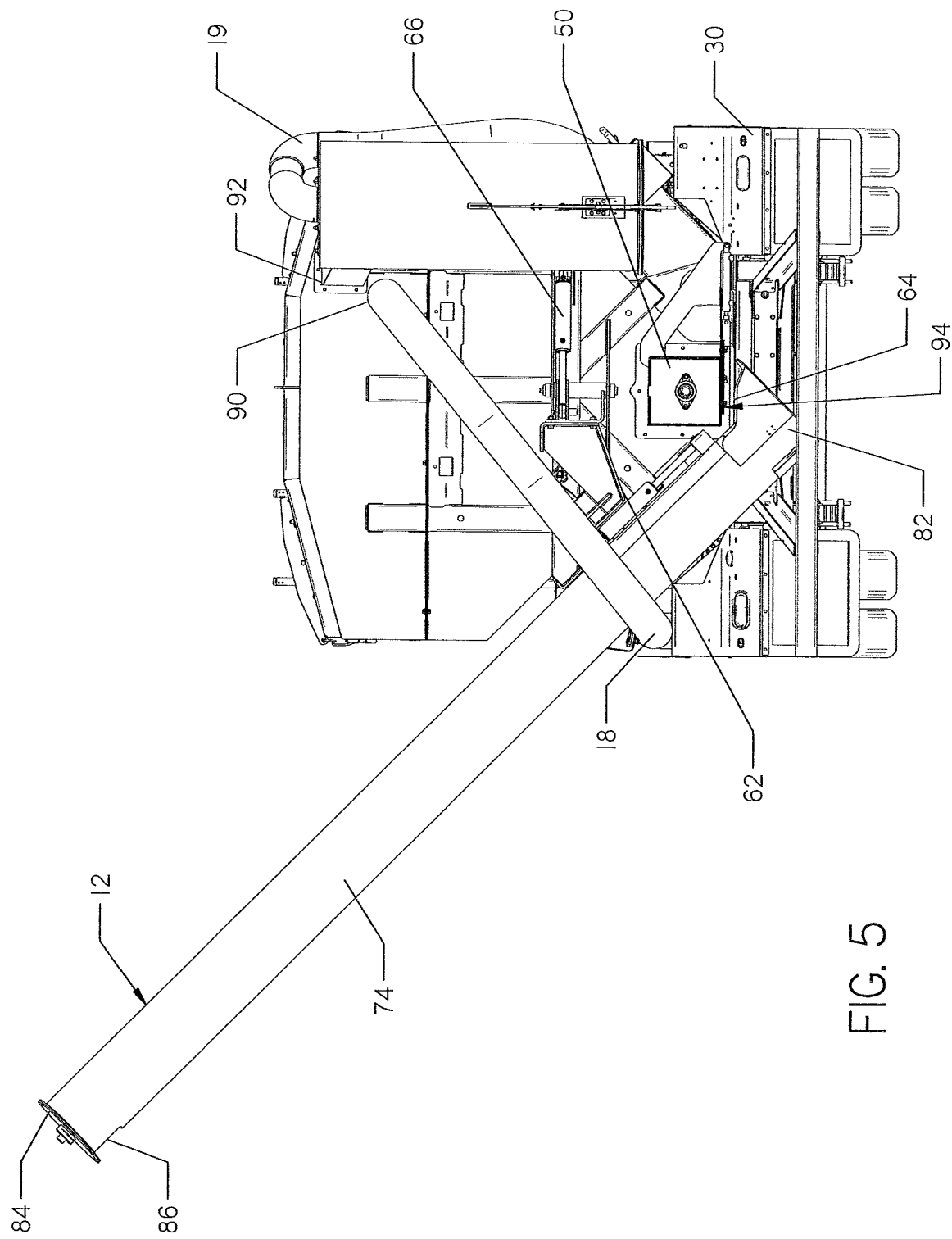
FIG. 5 is a rear view of the vacuum system. The external conveyor is shown in the raised position.

When stowed, the external conveyor 12 is positioned on a first side 28 of the vacuum system 10 and is substantially parallel to a bed 30 of the trailer 14. When the external conveyor 12 is in use, the external conveyor is in a raised position and is situated at a non-zero angle to the bed 30 of the trailer 14 (FIG. 5). For example, the external conveyor 12 is positioned at about a 45 degree angle to the bed 30 of the trailer 14 in FIG. 5. However, the external conveyor 12 may be raised or lowered to different angles as desired.

When in the raised position shown in FIG. 5, a first end 82 is situated below each portion of the tank 16. The second end 84 of the external conveyor 12 is disposed above each portion of the tank 16. This orientation allows particulates to fall from the tank 16 into the first end 82 due to gravity, yet to be removed by the external conveyor 12 into a dump container 120 with a high wall.

Figure 4:
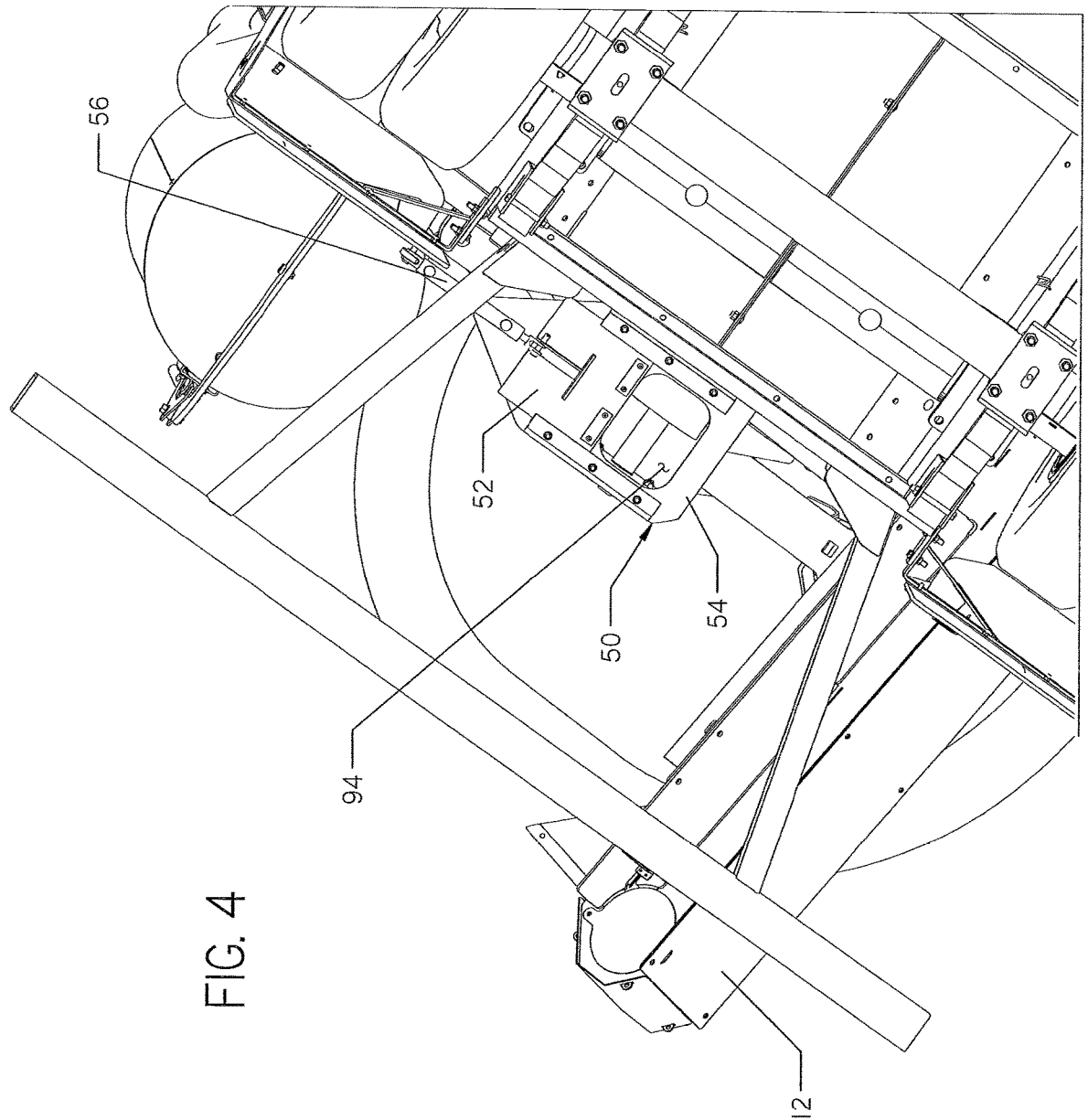
FIG. 4 is a bottom view of the rear end of the vacuum system. An offloading door is shown in an open position.

With reference to FIGS. 3-5, the tank 16 has an inlet 90, a first outlet 92 and a second outlet 94. The hose 18 is attached to the inlet 90. The hose 19 allows the blower to be in communication with the first outlet 92. The second outlet 94 is located at an offloading hub 50 and may be selectively covered by a door 52.

Figure 2:
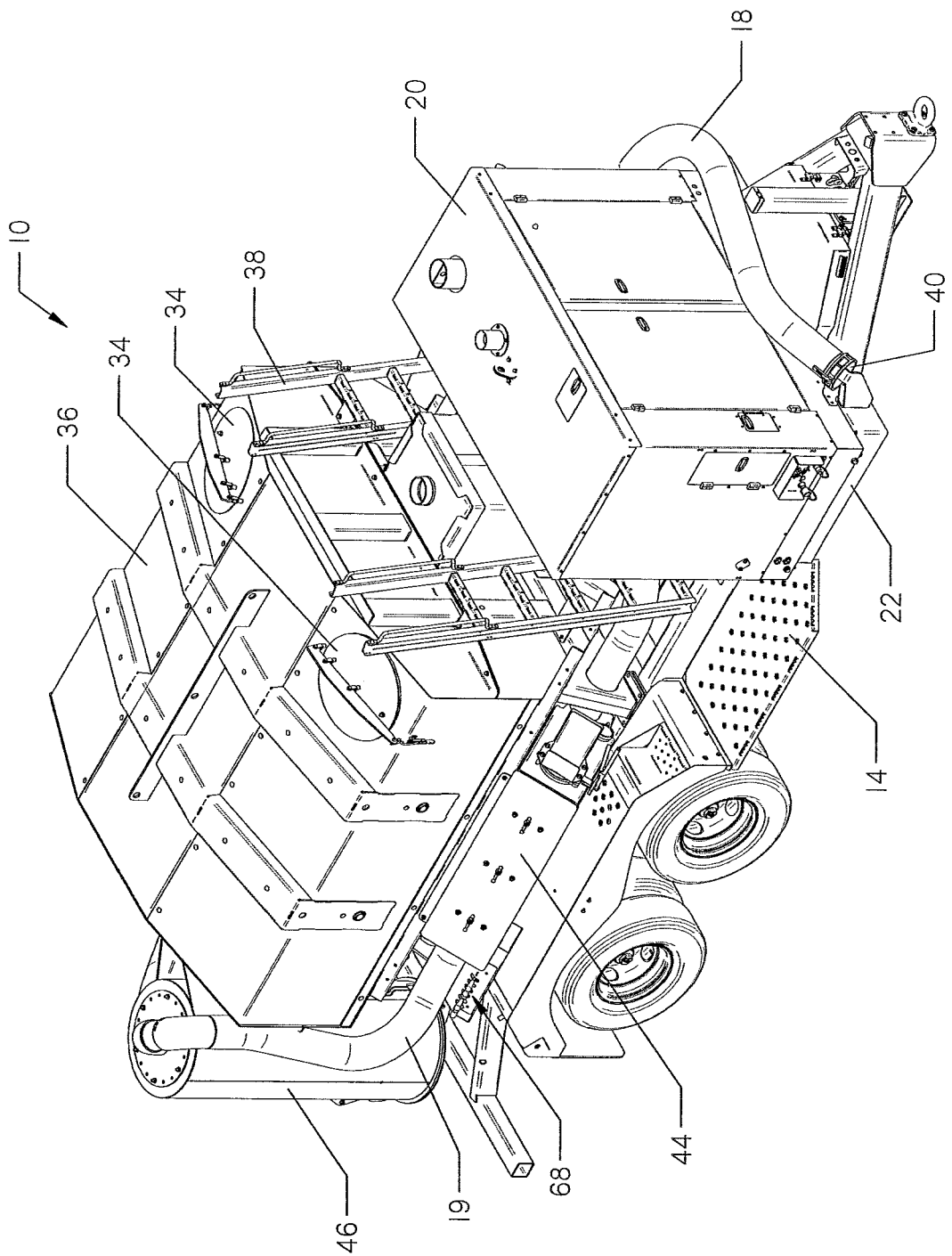
FIG. 2 is a perspective view of a second side of the vacuum system of FIG. 1.

Other than the inlet 90 and outlets 92, 94, the tank 16 is substantially sealed. As shown in FIG. 2, a set of hatches 34 are formed on a top end 36 of the tank 16 to provide access to the inside of the tank, if needed. A set of ladders 38 provide access to the hatches 34.

The hose 19 may have filtration systems interposed on it to clean the air before reaching the blower and power pack 20. As such, the hose 19 may comprise two or more sections. As shown in FIG. 2, air removed from the vacuum tank 16 travels through a cyclone separator 46 and a filter system 44.

The cyclone separator 46 is used to eliminate particulates from the air stream in the hose 19. Air within the separator 46 is moved in a spiraling motion, causing heavier particulates to diverge from the air and move toward the wall of the chamber. The cyclone separator 46 thus cleans the air of dust carried into the hose 19. Reducing dust further prolongs the life of the vacuum blower and filter 44 and reduces maintenance costs. With reference to FIG. 3, the cyclone separator 46 is attached to the rear end 27 of the tank 16. A door 48 is also provided on the cyclone separator 46 in order to empty the contents of the cyclone separator, if needed.

The filter system 44 is used to remove any remaining dust or particulates from the hose 18 before entering the vacuum blower powered by the power pack 20. One or more air filters may be provided within the filter system 44. The filter may be removed and replaced when it becomes clogged with particulates.

Air leaves the filter system 44 then travels through the hose 19 into a blower inlet 96.

Figure 10A:
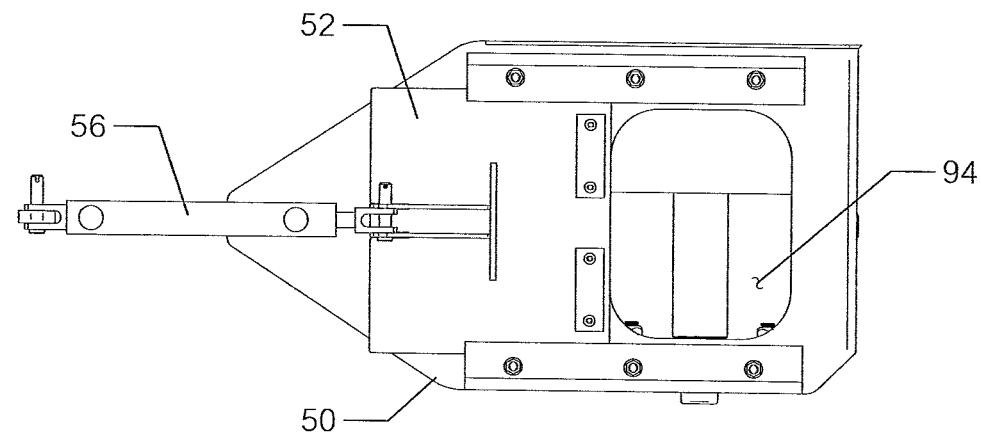
FIG. 10A is a bottom view of a door for use with the vacuum system, with the door in the open position.
Figure 10B:
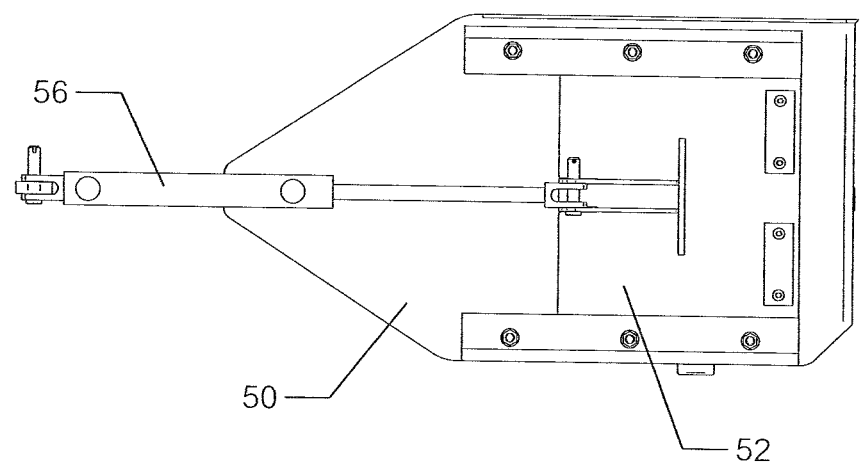
FIG. 10B is a bottom view of the door of FIG. 10A, with the door in the closed position.

With reference to FIGS. 3-4, the offloading hub 50 is formed on the rear end 27 of the tank 16 at the second outlet 94. The offloading hub 50 comprises a sliding door 52 formed on its bottom end 54 (FIG. 4) to cover the second outlet 94. As best shown in FIGS. 10A and 10B, the door 52 is opened and closed via a first hydraulic actuator 56. A light 58 positioned on a front end 60 of the offloading hub 50 may be illuminated if the door 52 is open. Material from inside the tank 16 may be released from the tank through the second outlet 94.

The second outlet 94 is ground facing and formed on a bottom of the tank 16 such that material from the tank 16 may be removed from the offloading hub 50 by operation of gravity.

Figure 6:
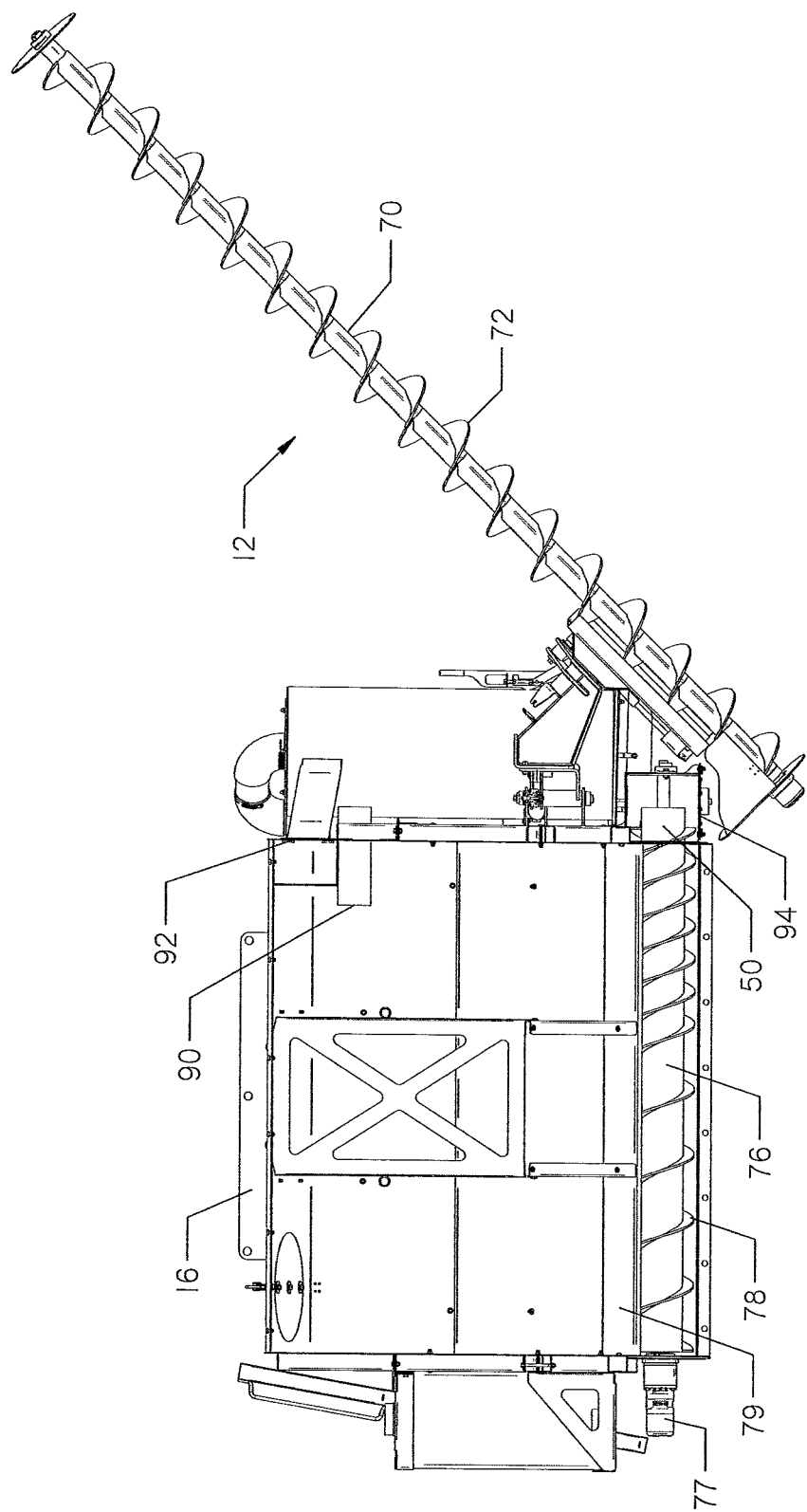
FIG. 6 is a side view of the first side of the vacuum tank. The left side of the tank has been removed. The external conveyor is shown in the raised position and a cover surrounding the external conveyor has been removed.
Figure 7:
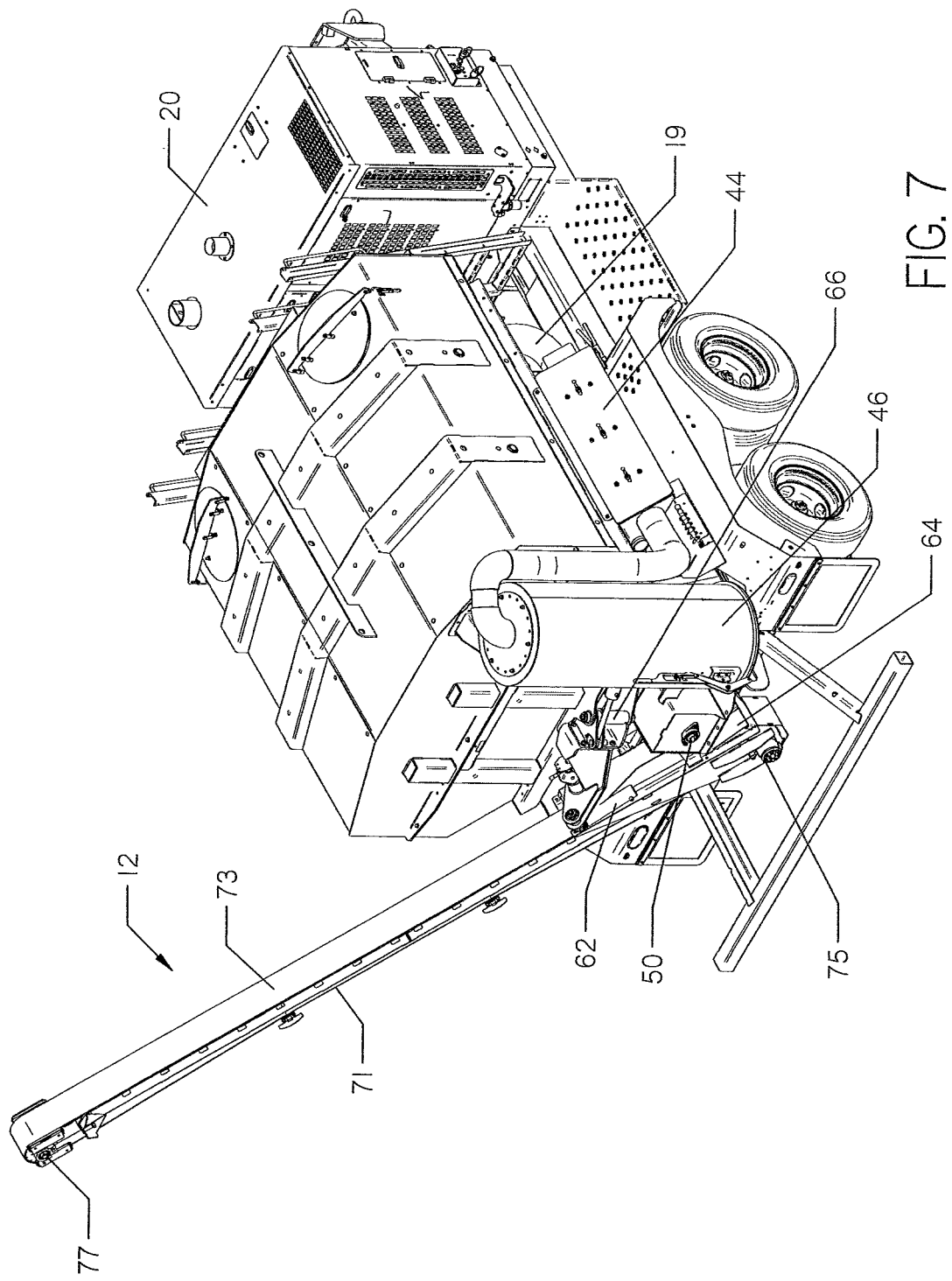
FIG. 7 is a rear perspective view of an alternative embodiment of the vacuum system. The external conveyor is shown in the raised position.
Figure 8:
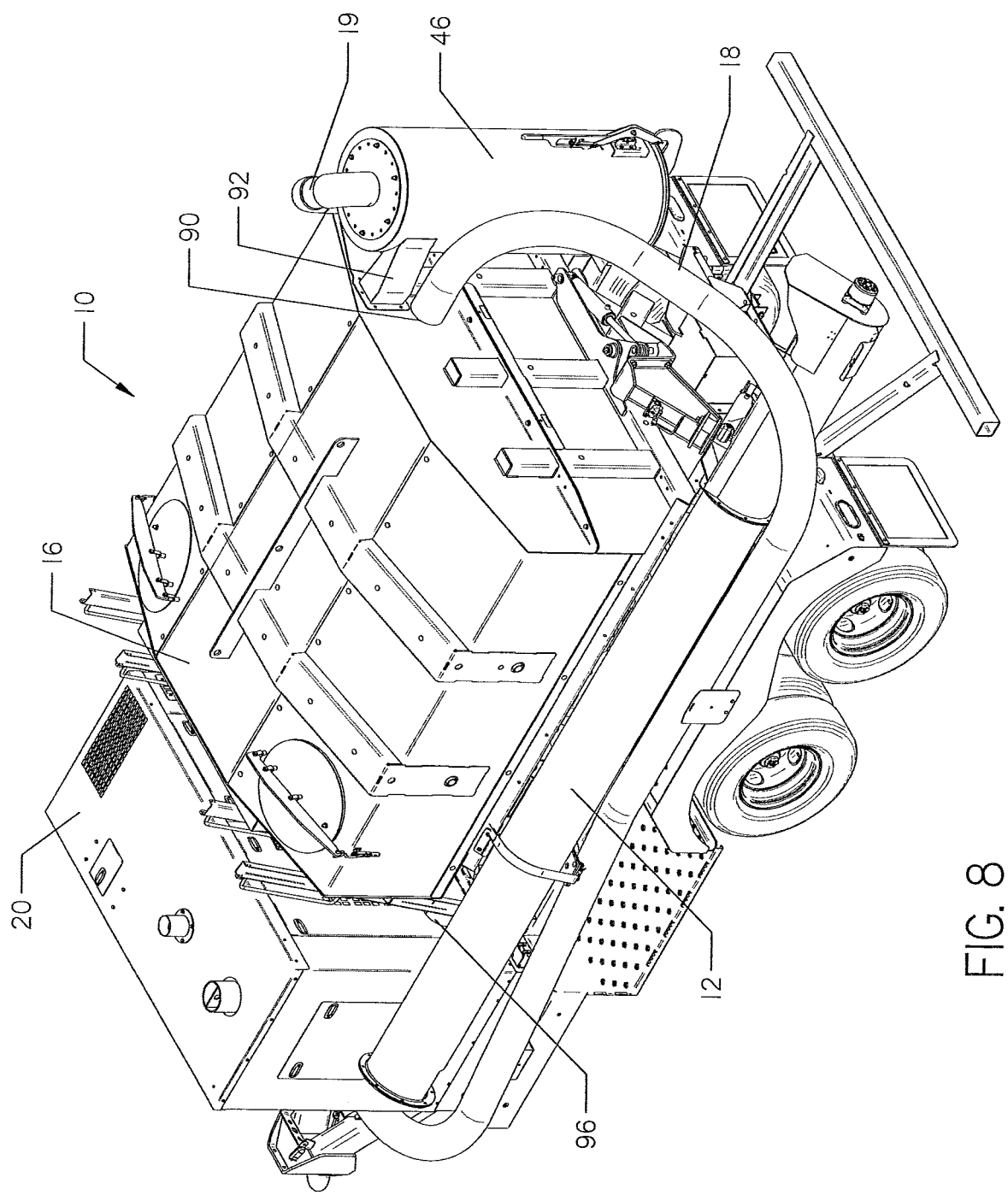
FIG. 8 is a back left top view of the vacuum system. The external conveyor is in the stowed position.

Turning now to FIGS. 5-7, the external conveyor 12 is moved to the raised position via a second hydraulic actuator 62. Once in the raised position, the external conveyor 12 is pivoted to position its opening 64 directly below the offloading hub 50. The external conveyor 12 is pivoted via a third hydraulic actuator 66. The hydraulic actuators 56, 62, 66 are operating by manipulating a set of controls 68 positioned on a second side 32 of the system 10 (FIG. 2).

The external conveyor 12 shown in FIG. 6 comprises a screw conveyor, or auger 70, having auger blades 72. The auger 70 is surrounded by a cylindrical cover 74 (FIG. 5). The cover 74 is removed in FIG. 6 to show the auger 70 structure.

Alternatively, the external conveyor 12 may comprise a conveyor 71 (FIG. 7) or other devices to raise loose materials to a higher elevation. The conveyor 71 comprises an endless belt 73 that rotates about a first drum 75 and a second drum 77. The endless belt 73 may have a series of ridges formed along its width and spaced apart from one another. Each ridge may have a repeating pattern, such as a chevron pattern. The ridges help bring material up the conveyor 71 during operation. A cover (not shown) may also surround the conveyor 71, if desired.

In either case, the external conveyor 12 as an input end situated near the second outlet 94 for receiving debris therethrough.

An internal conveyor or auger 76 having auger blades 78 is positioned at a bottom of the tank 16. Because the tank 16 has downwardly converging side walls, the material within the tank 16 is directed towards the internal auger 76. The internal auger 76 may rotate while the vacuum system 10 is operating or may remain stationary during operation. The auger blades 78 are configured to convey debris towards the offloading hub 50 when rotated. Preferably, as best shown in FIG. 6, the auger blades 78 may be more densely situated about the internal auger 76 near the offloading hub 50. To help move material towards the bottom of the tank 16, a vibrator may be installed.

Figure 9:
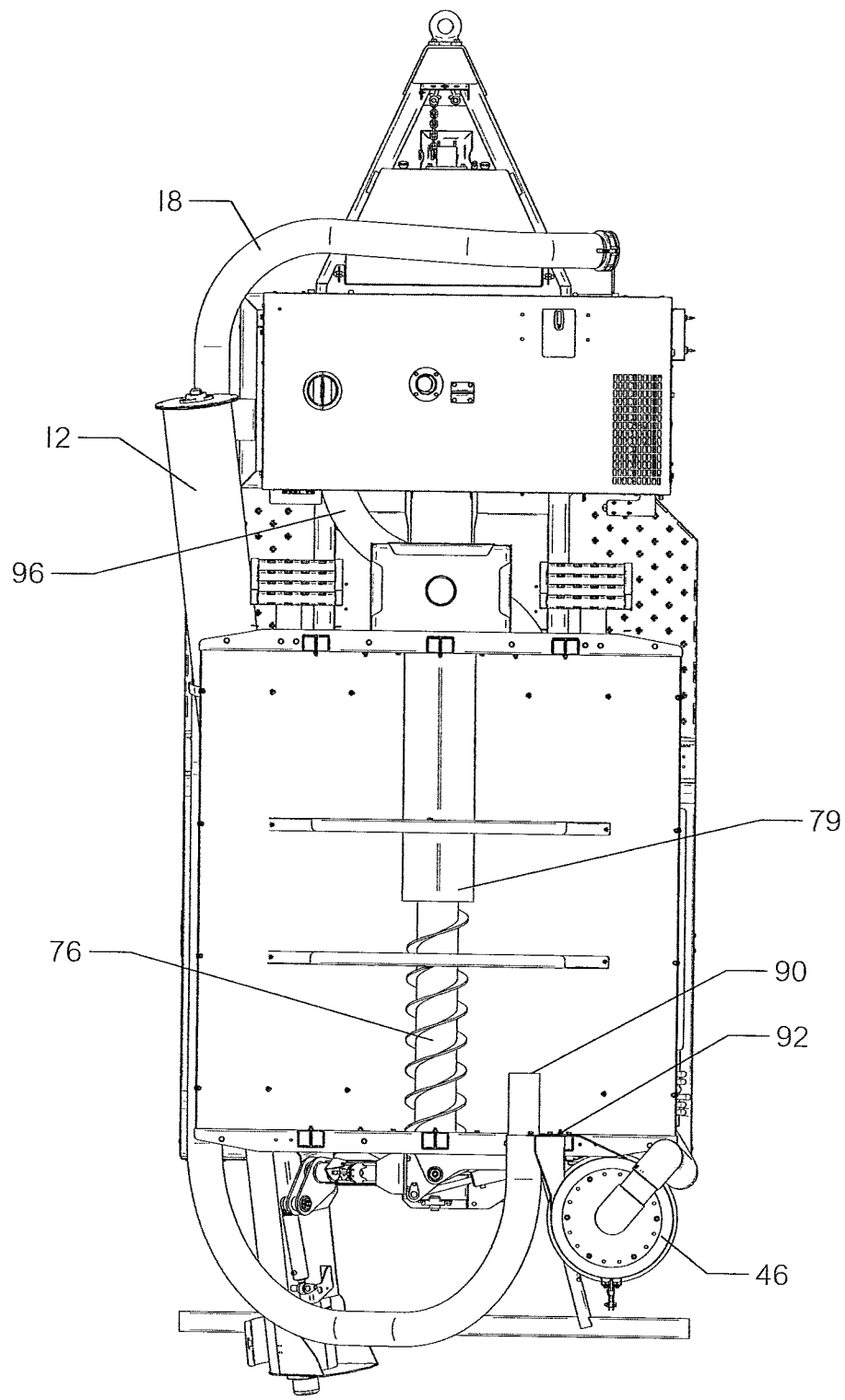
FIG. 9 is a top view of the vacuum system with the top panel of the tank removed. The auger shield disposed inside the tank is partially removed to see the auger therein.

A V-shaped shield 79 is disposed above the internal auger 76 to prevent the weight of debris within the tank 16 from impeding rotation of the internal auger 76. Debris on top of the shield 79 will move to each side of the internal auger 76. FIG. 9 shows this auger shield 79 partially cut-away to demonstrate the position of the internal auger 76.

The internal auger 76 is preferably disposed entirely within the tank 16. A belt conveyor or chain conveyor may be used in place of the internal auger 76 if desired. The internal auger 76 is rotated by an auger motor 77, which may be disposed outside of the tank 16.

To unload material from inside the tank 16, the external conveyor 12 may be moved to the raised position and positioned below the offloading hub 50. The door 52 to the offloading hub 50 is then opened (FIG. 4). The internal auger 76 rotates to move material inside of the tank 16 towards the ground-facing second outlet 94. Material exits the ground-facing second outlet 94 and falls into the opening 64 of the external conveyor 12.

The external conveyor 12 then transports material from its first end 82 or drum 75 to its second end 84 or drum 77. This may be accomplished by rotating the auger 70 or conveyor 71. Material is transported upwards via the auger blades 72 or ridges formed on the conveyor 71. Once the material reaches the second end 84 of the external conveyor 12 it may exit the external conveyor through an opening 86 formed at its second end 84 (FIG. 1). Alternatively, once the material reaches the second drum 77, it may simply fall off of the conveyor 71.

Material released from the external conveyor 12 may fall into a dump truck or other container 120 positioned underneath the second end 84 of the external conveyor 12. The external conveyor 12 allows material to be transported from the tank 16 to a position that is higher than a height of the tank 16. Once all of the material has been removed from the tank 16, the door 52 may be closed and the external conveyor 12 may be returned to its stowed position.

Figure 13:
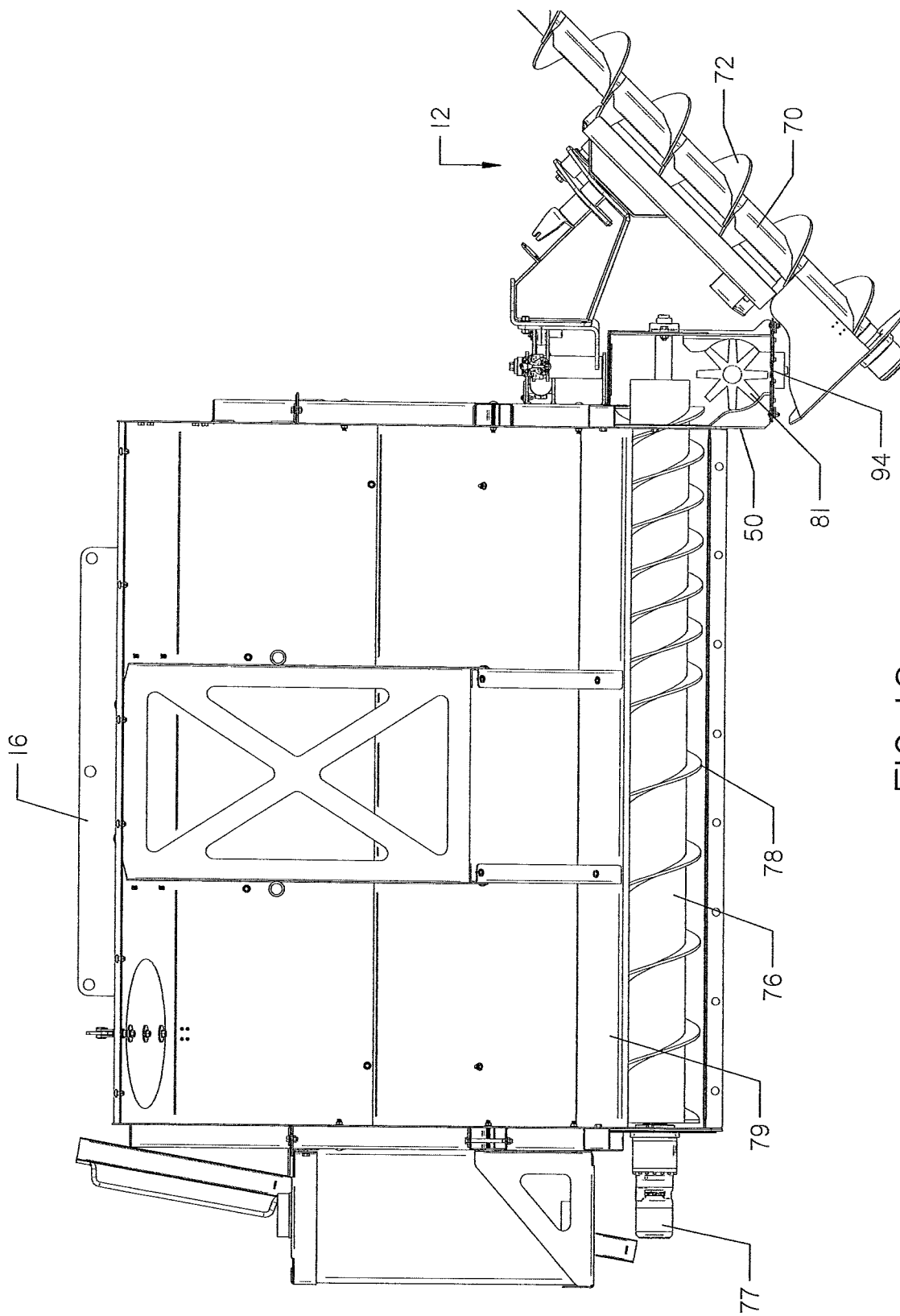
FIG. 13 is a side view of the first side of the vacuum tank having a rotary air lock at the second outlet. The left side of the tank has been removed. The external conveyor is shown in the raised position and a cover surrounding the external conveyor has been removed.

If the tank 16 can maintain sufficient air flow to operate, the door 52 may be opened during operation. For example, as shown in FIG. 13, a rotating airlock 81 may be used with the hub 50 to isolate the tank 16 from the second outlet 94. This allows the external conveyor 12 to transport material from the tank 16 to the dump container 120 while the vacuum system 10 operates. Oil or other lubricant may be sprayed on the internal auger 76 and the external conveyor 12 during operation.

Changes may be made in the construction, operation and arrangement of the various parts, elements, steps and procedures described herein without departing from the spirit and scope of the invention as described in the following claims.

The invention claimed is:

1. An apparatus comprising:
   a tank having an inlet, a first outlet, and a second outlet, in which the tank is characterized by an internal vacuum pressure;
   a plurality of ground contacting motive elements above which the tank is supported;
   an internal conveyor-situated entirely within the tank at vacuum pressure and having a discharge end situated near the second outlet;
   a blower in communication with the first outlet; and
   an external conveyer situated entirely outside of the tank having an input end situated near the second outlet.

2. The apparatus of claim 1 further comprising a conduit interconnecting the first outlet and the blower.

3. The apparatus of claim 2 further comprising a cyclone separator interposed in the conduit between the first outlet and the blower.

4. The apparatus of claim 2 further comprising a filler interposed in the conduit between the first outlet and the blower.

5. The apparatus of claim 1 further comprising an elongate hose in communication with the inlet.

6. The apparatus of claim 1 in which the external conveyor is an auger.

7. The apparatus of claim 1 in which the external conveyor is a belt.

8. The apparatus of claim 1 in which the second outlet is a ground-facing opening formed in the bottom of the tank.

9. The apparatus of claim 8 in which the external conveyor is movable from a stowed position wherein the second end is below the uppermost surface of the tank and an offloading position wherein the second end is above the uppermost surface of the tank.

10. The apparatus of claim 8 further comprising:
    a door movable between an open position, which the second outlet is open, and a closed position, in which the second outlet is closed; and
    a hydraulic cylinder configured to power movement of the door between its first and second positions.

11. The apparatus of claim 1 in which the first end of the external conveyer is situated below each portion of the tank and wherein the second end of the external conveyer is situated above each portion of the tank.

12. The apparatus of claim 1 in which the tank comprises a bottom portion characterized by downwardly converging side walls.

13. The apparatus of claim 12 in which the internal conveyor is situated wholly below the uppermost extremity of the bottom portion.

14. A system comprising:
    an excavation site having loose spoils generated by the excavation of a trench;
    the apparatus of claim 1;
    a hose interconnecting between the inlet of the tank and the excavation site; and
    a dump container disposed at the second end of the external conveyor.

15. A method of using, the system of claim 14 comprising:
    operating the blower to pull air and spoils from the vicinity of the trench into the tank by way of the hose;
    operating the internal conveyor to convey spoils within the tank to the second outlet; and
    operating the external conveyor to convey spoils from the second outlet of the tank to the dump container.

16. The method of claim 15 in which the second outlet is selectively closed by a door, further comprising:
    maintaining the door in an open state while spoils discharge from the second outlet.

17. The method of claim 15 further comprising:
    using the blower to remove air from the tank; and
    cleaning the removed air.

18. The system of claim 14 further comprising:
    a trencher disposed at the excavation site.

19. The system of claim 18 in which the input end of the external conveyor is situated below each part of the tank and the second end of the external conveyor situated above each part of the tank.

20. The apparatus of claim 1 in which the internal conveyor comprises an auger.

21. The apparatus of claim 1 in which the tank is characterized by a bottom surface having a length, wherein the internal conveyor is disposed along, the length of the tank's bottom.

22. The apparatus of claim 21 in which the internal conveyor is configured to move material within the tank along the length towards the second outlet.

* * * * *

UNITED STATES PATENT AND TRADEMARK OFFICE
CERTIFICATE OF CORRECTION

Page 1 of 1

PATENT NO. : 11,059,682 B2
APPLICATION NO. : 16/223568
DATED : July 13, 2021
INVENTOR(S) : Sewell It is certified that error appears in the above-identified patent and that said Letters Patent is hereby corrected as shown below:

In the Claims

Column 5, Claim 4, Line 1, please delete "filler" and substitute therefor "filter".
Column 6, Claim 10, Line 2, after the ",", please insert --in--.
Column 6, Claim 15, Line 1, please delete ",".
Column 6, Claim 21, Line 3, please delete ",".

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*